Oct. 12, 1937.  L. MEADOWS  2,095,507
REFLECTOR TYPE LICENSE PLATE
Filed Feb. 18, 1935
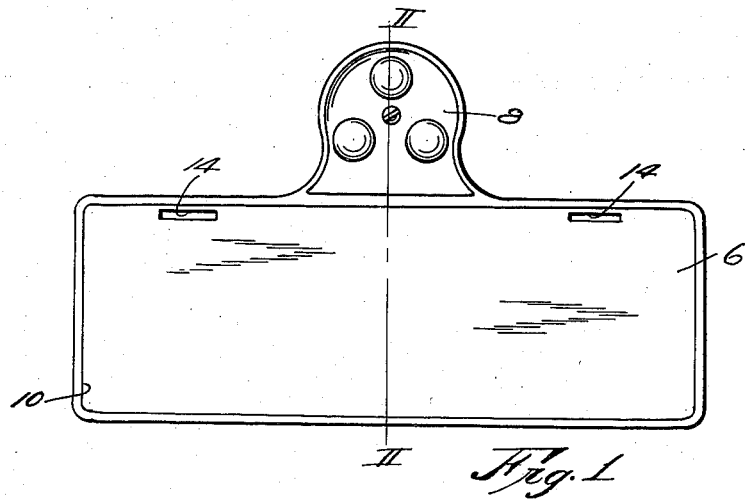
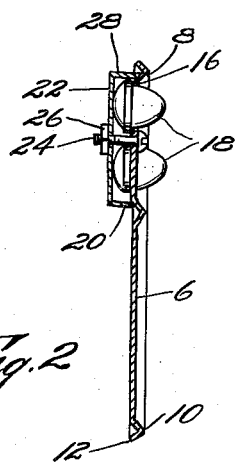
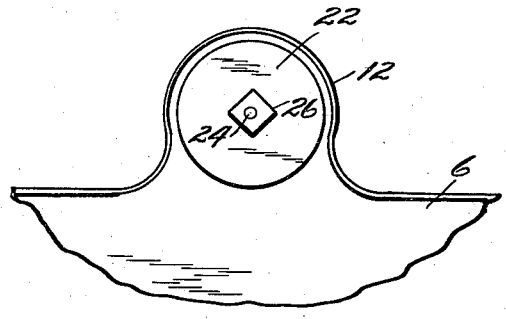
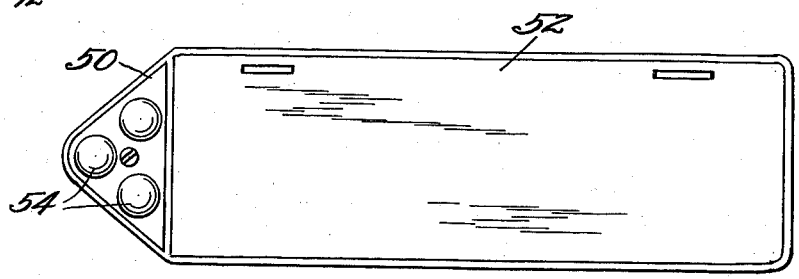
INVENTOR,
Lee Meadows.
BY
Hovey & Hamilton
ATTORNEYS.

Patented Oct. 12, 1937

2,095,507

UNITED STATES PATENT OFFICE 2,095,507

REFLECTOR TYPE LICENSE PLATE

Lee Meadows, Parsons, Kans.

Application February 18, 1935, Serial No. 7,050

1 Claim. (Cl. 40—125)

This invention relates to license plates of the character usually mounted upon automotive vehicles and the primary object is to provide such a plate that is of a reflector type, in that there is formed integrally with the body of the plate per se, a set-off area or portion thereof upon which is mounted reflectors of a suitable type that will contribute toward rendering the vehicle visible even though the electrically lighted lamps normally carried thereby be extinguished for some reason.

One of the important aims of this invention is to provide a reflector type license plate having both indicia-bearing and reflector-carrying portions thereon, said reflector-carrying portion having special means associated therewith for operably carrying effective reflectors which serve the purpose contemplated by this invention.

An even further object of the present invention is to provide a reflector type license plate which is specifically formed from an integral, substantially planar plate that has set off thereon an indicia-bearing area and an auxiliary area, the latter having a plurality of reflectors, at least a portion of which project forwardly from the face of the plate in its entirety and another portion which is housed by a suitable case removably mounted upon the plate to cover the rear face of the said auxiliary area.

Other important objects of the invention include the specific manner of forming the reflector type license plate and the use of an odd number of reflector members which, when grouped together as the invention provides, create refracting and reflecting actions upon the rays of light projected from a point distant from the license plate in such fashion as will immediately attract attention and present a signal that the license plate and the vehicle upon which it is mounted is present.

Many forms of the invention might be employed in license plates and but two exemplifications of the invention are herewith illustrated in the accompanying drawing, wherein:

Fig. 1 is a face view of a reflector type license plate made in accordance with the invention.

Fig. 2 is a central, cross section through the same, taken on line II—II of Fig. 1.

Fig. 3 is a fragmentary, back elevation of the license plate, and,

Fig. 4 is a face view of a reflector type license plate embodying a modified form of the invention.

In manufacturing a license plate of the character mentioned, the indicia-bearing area 6 and the auxiliary area 8 should preferably be formed by stamping from a single piece of sheet metal and when such is done, a bead 10 is embossed around the edges of the two areas 6 and 8 so as to present a rearwardly extending flange that is presented entirely around the plate. This edge 12 cooperates with the hereinafter described cap in a novel manner.

Indicia-bearing area 6 usually has the license numerals (not here shown) embossed therein and the conventional type slots 14 are employed to mount the plate on the bracket of the vehicle. In the preferred embodiment of the invention here illustrated, the auxiliary area 8 is intermediate the ends of area 6 and above the plate when it is mounted. This laterally extended area 8 has an arcuate top and is joined directly to the rest of the plate as illustrated in Figs. 1 and 2.

Area 8 has a plurality of apertures 16 through which are extended respectively reflectors 18 in the form of dome-shaped elements of colored glass specially formed as is known in the art and as fully set down in United States Letters Patent No. 1,828,233 of October 20, 1931. When this type of reflector is used, the rear portion thereof has a base 20, somewhat larger in diameter than the associated aperture 16 so that the reflector is removably held in operative position. When the reflectors are placed, a specially formed cap 22 is moved to place and held thereby a fixture such as an illustrated bolt 24. A nut 26 rigidly retains cap 22 over and against the bases 20 of reflectors 18.

Cap 22 should be formed to have an area commensurate with auxiliary area 8 and the annular wall 28 of the cap has its edge extending into the embossment 10 so that rearwardly extending edge 12 formed on the auxiliary area will co-operate therewith in creating a tight joint.

In the modified form shown in Fig. 4, the auxiliary area 50 is set apart from indicia-bearing area 52 in a manner similar to the form illustrated in Fig. 1, but it is disposed outwardly at the end of area 52. These two forms indicate that the auxiliary area 8 and its associated parts may be positioned where desired and so long as it is integral with the plate forming area 6 or 52, as the case may be, the salient feature of the invention is fulfilled.

As in the case previously described, the modified form of the plate shown in Fig. 4 carries the plurality of reflectors 54 that are mounted in precisely the same way as shown in Fig. 2. A suitable cap encasing the bases of reflectors 54 is also employed.

It is obvious from the foregoing that the reflectors might be grouped upon any set-off area on the license plate. It has been found important, if not essential, to group the reflectors in odd numbers, 3, 5, 7, etc. When such is done, the reflecting and refracting powers of the reflectors tend to concentrate the returning rays in a most efficient manner.

Having thus described the invention, what is claimed as new and desired to be secured by Letters Patent is:

A device of the character described comprising a plate, having an area thereon for indicia and slots provided therein whereby the same may be attached for use as an automobile license plate; a continuous, forwardly pressed embossment formed in and circumscribing the plate and setting off an area thereof to serve as means immediately adjacent the first mentioned area, for carrying attention-attracting members; a series of apertures formed through the plate within the area set off by said embossment; a shouldered reflector element projecting through each aperture respectively with the shoulders thereof against one side of the plate; a cap, having a laterally extending wall integral therewith, co-extensive with the said embossment and having a free edge projecting thereinto when in operative position; and fastening means for holding the cap in place, said reflector elements projecting rearwardly into the cap a distance slightly greater than the width of the wall whereby pressure is exerted against the said elements by the cap before the free edge of the cap is drawn against the bottom of the embossment by said fastening means, said reflector elements extending forwardly through the containing apertures a distance greater than the height of said embossment whereby the said elements may be seen when viewing the edge of said plate.

LEE MEADOWS.